United States Patent [19]

Jones

[11] 4,220,733
[45] Sep. 2, 1980

[54] THERMALLY STABLE, FLAME-RETARDANT POLYMERS

[75] Inventor: Richard H. Jones, Newark, Del.

[73] Assignee: E. I. Du Pont de Nemours and Company, Wilmington, Del.

[21] Appl. No.: 35,098

[22] Filed: May 1, 1979

[51] Int. Cl.$^2$ ............................................. C08L 77/00
[52] U.S. Cl. ..................................... 525/66; 525/179; 525/183; 260/45.95 G
[58] Field of Search .......................... 525/66, 179, 183

[56] References Cited

U.S. PATENT DOCUMENTS

| | | | |
|---|---|---|---|
| 3,264,272 | 8/1966 | Rees | 260/78.5 |
| 3,373,224 | 3/1968 | Mesrobian | 525/183 |
| 3,989,531 | 11/1976 | Orlando | 106/15 FP |
| 4,105,709 | 8/1978 | Iwami | 260/857 L |
| 4,137,212 | 1/1979 | Theysohn | 525/66 |
| 4,141,880 | 2/1979 | Nametz | 260/37 N |

FOREIGN PATENT DOCUMENTS

| | | |
|---|---|---|
| 2021830 | 11/1970 | Fed. Rep. of Germany . |
| 2432833 | 1/1976 | Fed. Rep. of Germany . |
| 2550803 | 5/1976 | Fed. Rep. of Germany . |
| 2622973 | 9/1976 | Fed. Rep. of Germany . |
| 2654168 | 1/1978 | Fed. Rep. of Germany . |
| 2659537 | 6/1978 | Fed. Rep. of Germany . |
| 2369312 | 6/1978 | France . |
| 48-49832 | 7/1973 | Japan . |
| 50-117737 | 4/1975 | Japan . |
| 53-065353 | 6/1978 | Japan . |
| 53-038759 | 10/1978 | Japan . |

*Primary Examiner*—Paul Lieberman

[57] ABSTRACT

It has been found that selected oligomers and antimony oxide when employed with a polyamide and selected modified polyolefin resin blends results in a flame retardant resin that has better stability toward thermal degradation than when some other brominated flame retardants are employed with the blend.

9 Claims, No Drawings

THERMALLY STABLE, FLAME-RETARDANT POLYMERS

FIELD OF THE INVENTION

This invention relates to flame retardant polyamide resins and more particularly to resins comprising a blend of a polyamide and selected modified polyolefin tougheners.

BACKGROUND OF THE INVENTION

Brominated compounds in conjunction with metal oxide synergists have been employed heretofore with polyamides to make resins which have improved flame-retardance over the thermoplastic polymer alone. Recently, it has been found that if minor amounts of a selected modified polyolefin are added to the polyamide, the resulting blend has greater toughness in molded article form. The addition of the modified polyolefin renders the polyamide more flammable. Thus, the modified polyolefin/polyamide blend is more difficult to flame retard using some common metal oxide synergists for polyamides, such as iron oxide or zinc ferrite. A more active synergist, antimony oxide, must be used to impart good flame retardance.

However, the combination of antimony oxide with many brominated flame retardants tends to degrade the polyamide component of the resin blend when the resin is subjected to melt-processing temperatures.

SUMMARY OF THE INVENTION

It has now been found that a selected oligomer when employed with antimony oxide in a blend of polyamide and modified polyolefin results in a flame retardant resin that has better stability toward thermal degradation than when some other brominated flame retardants are employed with antimony oxide in the blend.

More specifically, the flame retardant resins of this invention consist essentially of (a) a 98:2 to 60:40 blend by weight of at least one polyamide of film-forming molecular weight and at least one polyolefin of film-forming molecular weight that is either (i) an adduct of an unsaturated carboxylic dianhydride and a hydrocarbon polymer having a saturated backbone chain and unsaturated hydrocarbon side chains, which contains between about 0.5 and 9 percent, preferably 1-4 percent, by weight of adduct, of the dianhydride, or (ii) an ionic copolymer of an α-olefin and an α,β-ethylenically unsaturated carboxylic acid in which the acid monomer content of the copolymer is between about 0.2 and 25 mol percent based on the copolymer, in which at least 10 percent of the carboxyl groups of the acid are neutralized with metal ions, or (iii) a mixture of an unsubstituted polyolefin and either the adduct defined in (i) or the ionic copolymer defined in (ii), (b) between about 1 and 30 percent by weight of resin an oligomer represented by the formula

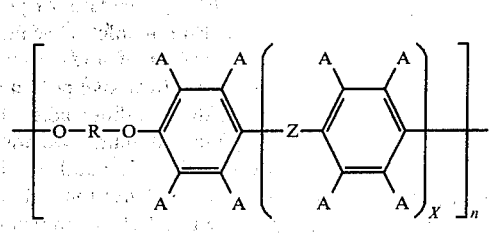

wherein R is a divalent aryl-containing organic group of between about 6 and 15 carbon atoms, and preferably is

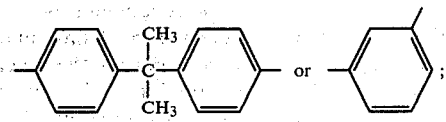

X is zero or 1; Z is oxygen, sulfur,

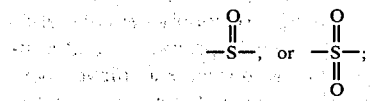

each A is independently hydrogen or bromine with the proviso that when X is 1, at least six of the A groups are bromine, and when X is zero, all of the A groups are bromine; and n is a cardinal number $\phi$ between about 2 and about 20; and (c) between about 1–15 percent, preferably 3–10 percent, by weight of resin, antimony oxide.

DESCRIPTION OF THE INVENTION

The flame retardant resins of this invention are prepared by mixing a blend of the polyamide/modified polyolefin by any convenient means with the oligomer and antimony oxide. Ordinarily the ingredients are mixed by physically mixing them together and then extruding the mixture through an extruder.

The polyamides useful herein are well known in the art. They are of film-forming molecular weight. The polyamide resin can be produced by condensation of equimolar amounts of a saturated organic dicarboxylic acid containing from 4–12 carbon atoms with an organic diamine containing 2–13 carbon atoms, in which the diamine can be employed, if desired, to provide an excess of amine end groups over carboxyl end groups in the polyamide. Vice versa, the diacid can be used to provide an excess of acid groups. Equally well, these polyamides may be made from acid-forming and amine-forming derivatives of said amines and acids such as esters, acid chlorides, amine salts, etc. Representative dicarboxylic acids used to make the polyamides include adipic acid, pimelic acid, suberic acid, sebacic acid, and dodecanedioic acid, while representative diamines include hexamethylenediamine and octamethylenediamine. In addition, the polyamide can also be prepared from self-condensation of a lactam. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), poly bis-(4-aminocyclohexyl) methane dodecanoamide, or the polyamides produced by ring opening of lactams; i.e., polycaprolactam, (6 nylon), polylauric lactam, or poly-11-aminoundecanoic acid. It is also possible to use polyamides prepared by the polymerization of at least two of the amines or acids used to prepare the above polymers, as for example, a polymer made of adipic acid, and isophthalic acid and hexamethylene diamine. Blends of polyamides, such as a mixture of 66 nylon and 6 nylon are also included. Preferably the condensation polyamide employed herein is polyhexamethylene adipamide (66 nylon), or a blend of polyhexamethylene adipamide (66 nylon) and polycaprolactam (6 nylon).

The polyamide resin is blended with about 2–40% by weight of blend of a polymer which toughens articles molded from the blend compared with articles molded from the polyamide alone. The toughening polymer is either the adduct described in (i) of the definition of the resins of this invention in the Summary of the Invention further above, or the ionic copolymer defined in (ii) therein, or the mixture defined in (iii) therein.

In the adducts, the backbone is substantially saturated and the side-chains contain unsaturation which serve as the sites at which grafting takes place. These backbone-side chain polymers are generally copolymers of olefins and diolefins, such as ethylene or propylene, and a diene, such as 1,4-hexadiene, norbornadiene, dicyclopentadiene, ethylidene norbornene and butadiene or the like. A specific example is a copolymer of ethylene, propylene and 1,4-hexadiene and/or norbornadiene. The unsaturated carboxylic dianhydride can be maleic anhydride, fumaric anhydride, or the like. A preferred adduct is one in which the copolymer is a copolymer of ethylene, at least one $C_3$-$C_6$ $\alpha$-olefin and at least one nonconjugated diene, preferably 1,4-hexadiene, and the dianhydride is maleic anhydride.

The ionic copolymers are copolymers of $\alpha$-olefins of 1–8 carbon atoms with $\alpha,\beta$-ethylenically unsaturated carboxylic acids of 3–8 carbon atoms. Examples of such acids include acrylic, methacrylic, itaconic, maleic, fumaric and the like. Preferably the carboxylic acid will comprise from between 0.2 to 25 mol percent, and preferably 1 to 10 percent, of the copolymer. Preferably, the $\alpha$-olefin will be ethylene and the carboxylic acid comonomer will be acrylic or methacrylic acid. The carboxyl groups in the copolymer can be neutralized with metal cations, preferably at least 10 percent of the carboxyl groups, will be neutralized. Sodium zinc or potassium are the preferred neutralizing agents. Representative $\alpha$-olefins include ethylene, propylene, butene-1, pentene-1, etc. Examples of such monomers include acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride.

In addition, the adduct or the ionic copolymer can be employed in admixture with polyethylene, if desired, of amounts up to about 50 percent of the weight of the two.

The oligomers can be prepared by reacting an aromatic diol of the formula

HO—R—OH in which R is aromatic and may be, e.g., phenylene, biphenylene, or two aromatic benzene rings separated by an alkylidene group, such as

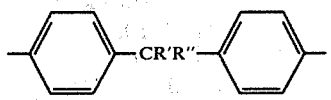

wherein each R' and R" can be hydrogen or lower (C-1 to C-6) alkyl, with a brominated compound of the formula

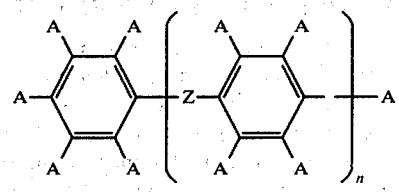

wherein n is zero or 1; Z is O, S,

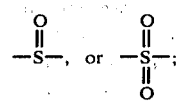

each A is independently hydrogen or bromine with the proviso that when n is 1, at least six of the A groups are bromine; and when n is zero, all of the A groups are bromine. Representative diols include resorcinol, "Bisphenol A" (2,2-bis-(4-hydroxy phenyl)propane), hydroquinone, 4,4'-biphenol, 4,4'-dihydroxybenzophenone, 4,4'-dihydroxydiphenyl sulfone and the like.

Representative brominated compounds employed preparing the oligomers include hexabromobenzene, decabromodiphenyl ether, decabromodipheyl sulfide, tetrabromobenzene, and octabromodiphenyl ether.

The process for preparing the oligomers is preferably carried out in a solvent for at least one and preferably both the monomers, such as dimethyl acetamide.

The reaction mixture is maintained at a temperature between about 25° and about 250° C. For convenience, reflux temperature can be employed. Atmospheric pressure is employed. The oligomers are usually prepared by reacting substantially equimolar portions of the aromatic diol and brominated compound, although slight excesses of either component can be used to limit molecular weight.

Suitable bases used to carry out the reaction include alkali metal hydroxides of salts of weak acids.

In the Examples which follow, thermal stability of the resins obtained therein was determined by measuring the melt index (a measurement of the molecular weight of the polymer in the resin-the higher the melt index the lower the molecular weight of the polymer measured) in a standard melt index apparatus using ASTM method D1238-73. The apparatus had a 0.0823 inch (2.09 mm) orifice and a 2170 g weight was used to force the polymer through the orifice at a temperature of 280° C. or 300° C.

Tensile strength and elongation measurements were measured as described in ASTM D638-77a except that 3 specimens rather than 5 were tested and samples were not conditioned at 50% relative humidity but, rather, were tested dry as molded (DAM) after conditioning for 24 hours under nitrogen at 23° C.

Flexual modulus was measured as described in ASTM D790-71 except that 3 rather than 5 specimens were tested and conditioning was carried out for 24 hours under nitrogen at 23° C. (DAM).

Notched Izod was measured by the procedure described in ASTM D256-73. Samples were tested dry as molded (DAM) after conditioning for 24 hours under nitrogen at 23° C.

EXAMPLE 1

A polymer blend composed of 81% (wgt.) 66 nylon of number average molecular weight 18,000, 9% (wgt.) of a 72% (wgt.) ethylene/25% (wgt.) propylene/2.8% (wgt.) hexadiene - 1,4 terpolymer of weight average molecular weight 189,000 and 10% (wgt.) of a 70% (wgt.) ethylene/26% (wgt.) propylene/4.4% (wgt.) hexadiene - 1,4terpolymer grafted with 1.75% (wgt.) succinic anhydride groups prepared as described in Example 4 of U.S. Pat. No. 4,026,967 was rendered flame retardant with a mixture of $Sb_2O_3$ and an oligomer of decabromodiphenyl ether and 2,2-bis-(p-hydroxyphenyl) propane. A mixture composed of 763 g of the oligomer, 297 g of antimony oxide, and 3178 g of the polymer blend was melt compounded in a 28 mm twin screw extruder at a temperature of 287° C. The product had good thermal stability up to 10 minutes as shown by the relatively small change in melt index.

| MELT INDEX VALUES AT 300° C. | |
|---|---|
| Minutes at 300° C. | Melt Index (g/10 Minutes) |
| 5 | 4.7 |
| 10 | 5.9 |
| 15 | 12.3 |

The compounded polymer was molded into test bars in a 6 oz. injection molding machine at a polymer melt temperature of 287° C. Bars 1.6 mm (1/16") were tested as molded by UL94 and were rated V-O with an average burn time of 2.8 seconds. Bars retained excellent toughness with a notched Izod value (dry as molded) of 313 J/m (5.87 ft. lb./in.).

The thermal stability of the composition was demonstrated by adjusting cycle conditions so that the time the polymer resided in the injection molding machine at 287° C. varied from 2 to 8 minutes. Physical properties obtained with various residence times in the injection molding machine are shown below.

| Residence Time (minutes) | 2.1 | 5 | 8 |
|---|---|---|---|
| Notched Izod (J/m) | 313 | 195 | 152 |
| Tensile Strength (MPa) | 44.8 | 43.3 | 43.1 |
| Percent Elongation | 9.2 | 12.2 | 9.2 |

Although notched Izod values decline with increasing residence time, considerable toughness (high notched Izod) remains even after 8 minutes at 287° C.

EXAMPLE 2

An oligomer of "Bisphenol A" and decabromodiphenyl ether had an inherent viscosity of 0.03 dl/g in 0.5 g/100 ml. chlorobenzene at 30° C. and a number average molecular weight of 4930 by vapor pressure osmometry in o-dichlorobenzene at 100° C.

The thermal stability obtained with the oligomeric bromine compound was demonstrated by preparing blends from 1.6 grams $Sb_2O_3$, 4.0 grams of brominated oligomer, and 14.4 grams of the nylon blend used in Example 7 in powder form. The powder was well mixed, dried overnight in a vacuum oven at 110° C., and melt indexes run at 280° C. Identical compositions using brominated monomers in place of the oligomer were also prepared and tested. Results obtained are shown below.

| MELT INDEX OF BLENDS | | | |
|---|---|---|---|
| Mminutes at 280° C. | Ethylene bis-(tetrabromophthalimide) | Decabromodiphenylether | "Bisphenol A"-Decabromodiphenyl ether oligomer |
| 5 | 0.29 g/min | 0.27 g/min | 0.34 g/min |
| 10 | 17.6 | 10 | 0.36 |
| 15 | — | — | 0.50 |

Compositions prepared with the oligomeric bromine compound showed relatively little change in melt index after 15 minutes at 280° C.; while the nonoligomeric bromine-containing compositions show considerable increase in melt index even after 10 minutes at 280° C.

I claim:
1. A flame retardant resin consisting essentially of
   (a) a 98:2 to 60:40 blend by weight of at least one polyamide of film-forming molecular weight and at least one polyolefin of film-forming molecular weight that is either
      (i) an adduct of an unsaturated carboxylic dianhydride and a hydrocarbon polymer having a saturated backbone chain and unsaturated hydrocarbon side chains, which contains between about 0.5 and 9 percent, preferably 1–4 percent, by weight of adduct, of the dianhydride, or
      (ii) an ionic copolymer of an α-olefin and an α,β-ethylenically unsaturated carboxylic acid in which the acid monomer content of the copolymer is between about 0.2 and 25 mol percent based on the copolymer, in which at least 10 percent of the carboxyl groups of the acid are neutralized with metal ions, or
      (iii) a mixture of an unsubstituted polyolefin and either the adduct defined in (i) or the ionic copolymer defined in (ii),
   (b) between about 1 and 30 percent by weight of resin of an oligomer represented by the formula

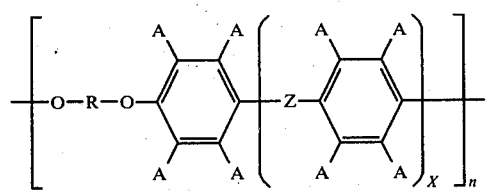

wherein R is a divalent aryl-containing organic group of between about 6 and 15 carbon atoms, and preferably is

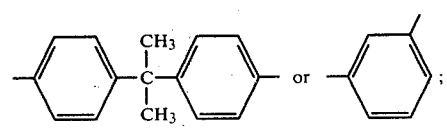

X is zero or 1; Z is oxygen, sulfur,

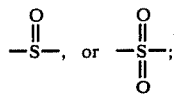

each A is independently hydrogen or bromine with the proviso that when X is 1, at least six of the A groups are bromine, and when X is zero, all of the A groups are bromine; and n is a cardinal number $\phi$ between about 2 and about 20; and (c) between about 1–15 percent, preferably 3–10 percent, by weight of resin, antimony oxide.

2. The flame retardant resin of claim 1 wherein the polyolefin employed is an adduct defined in part (ai) of claim 1.

3. The flame retardant resin of claim 1 wherein the polyolefin employed is an ionic copolymer defined in part (aii) of claim 1.

4. The flame retardant resin of claim 1 wherein the polyolefin is a mixture defined in part (aiii) of claim 1.

5. The flame retardant resin of claim 2 wherein the adduct is an ethylene/propylene/hexadiene-1,4 copolymer grafted with an unsaturated carboxylic anhydride.

6. The resin of claim 5 which additionally contains an ethylene/propylene/hexadiene-1,4 terpolymer.

7. The flame retardant resin of claim 1 wherein the polyamide is polyhexamethylene adipamide.

8. The flame retardant resin of claim 1 wherein the polyamide is a blend of polyhexamethylene adipamide and polycaprolactam.

9. The flame retardant resin of claim 3 wherein the α-olefin is ethylene and the carboxylic acid is methacrylic acid.

* * * * *